(12) United States Patent
van Os

(10) Patent No.: US 8,004,727 B2
(45) Date of Patent: Aug. 23, 2011

(54) AUTOMATICALLY ADJUSTING MULTI-MEDIA SCANNER

(75) Inventor: Ron van Os, Morrison, CO (US)

(73) Assignee: Visioneer, Inc., Pleasanton, CA (US)

( * ) Notice: Subject to any disclaimer, the term of this patent is extended or adjusted under 35 U.S.C. 154(b) by 1048 days.

(21) Appl. No.: 11/879,188

(22) Filed: Jul. 16, 2007

(65) Prior Publication Data

US 2009/0021799 A1  Jan. 22, 2009

(51) Int. Cl.
*H04N 1/04* (2006.01)

(52) U.S. Cl. ........ 358/496; 358/482; 358/483; 358/473; 358/498

(58) Field of Classification Search ................. 358/473, 358/472, 496, 498, 474, 505, 408, 482, 483, 358/512–514; 382/313, 312, 318, 319; 399/367, 399/364; 355/23, 24, 40; 250/239, 208.1; 271/286

See application file for complete search history.

(56) References Cited

U.S. PATENT DOCUMENTS

| | | | | |
|---|---|---|---|---|
| 4,970,606 A * | 11/1990 | Shima | ........................... | 358/474 |
| 5,267,058 A * | 11/1993 | Sata | ............................... | 358/498 |
| 5,594,486 A * | 1/1997 | Kiyohara | ....................... | 347/104 |
| 5,764,382 A * | 6/1998 | Shiraishi | ........................ | 358/496 |
| 5,903,365 A * | 5/1999 | Iwata et al. | .................... | 358/498 |
| 5,973,799 A * | 10/1999 | Gatto et al. | .................. | 358/498 |
| 6,128,105 A * | 10/2000 | Ishikawa et al. | .............. | 358/483 |
| 6,942,213 B2 * | 9/2005 | Endo et al. | ..................... | 271/186 |
| 7,139,520 B2 * | 11/2006 | Echigo et al. | ................. | 399/329 |
| 7,258,500 B2 * | 8/2007 | Furihata et al. | ............... | 400/188 |
| 7,355,763 B2 * | 4/2008 | Furihata | ........................ | 358/474 |
| 7,414,763 B2 * | 8/2008 | Jo | ................................... | 358/498 |
| 7,715,064 B2 * | 5/2010 | Yoshida et al. | ............... | 358/474 |
| 2005/0212895 A1 * | 9/2005 | Nishitani | ....................... | 347/215 |
| 2007/0095917 A1 * | 5/2007 | van Os | ........................... | 235/454 |

* cited by examiner

*Primary Examiner* — Cheukfan Lee

(57) ABSTRACT

The invention claimed is a scanner which allows for any type of media, including embossed credit cards, with a thickness in the range of 0.1 mm to 1.5 mm to be inserted into the media path and remain in constant contact with the CIS as a result of a spring loaded roller, gear, and cantilever system. The input process, called a "kick start" method, allows for momentary lowering of the roller, and return, as it spins to grasp the media and continue pulling the media through the scan path. This apparatus stores energy provided by the motor within its spring and gear system, thus requiring less energy from the motor, and reduces manufacturing costs.

9 Claims, 2 Drawing Sheets

Automatically adjusting multi-media scanner

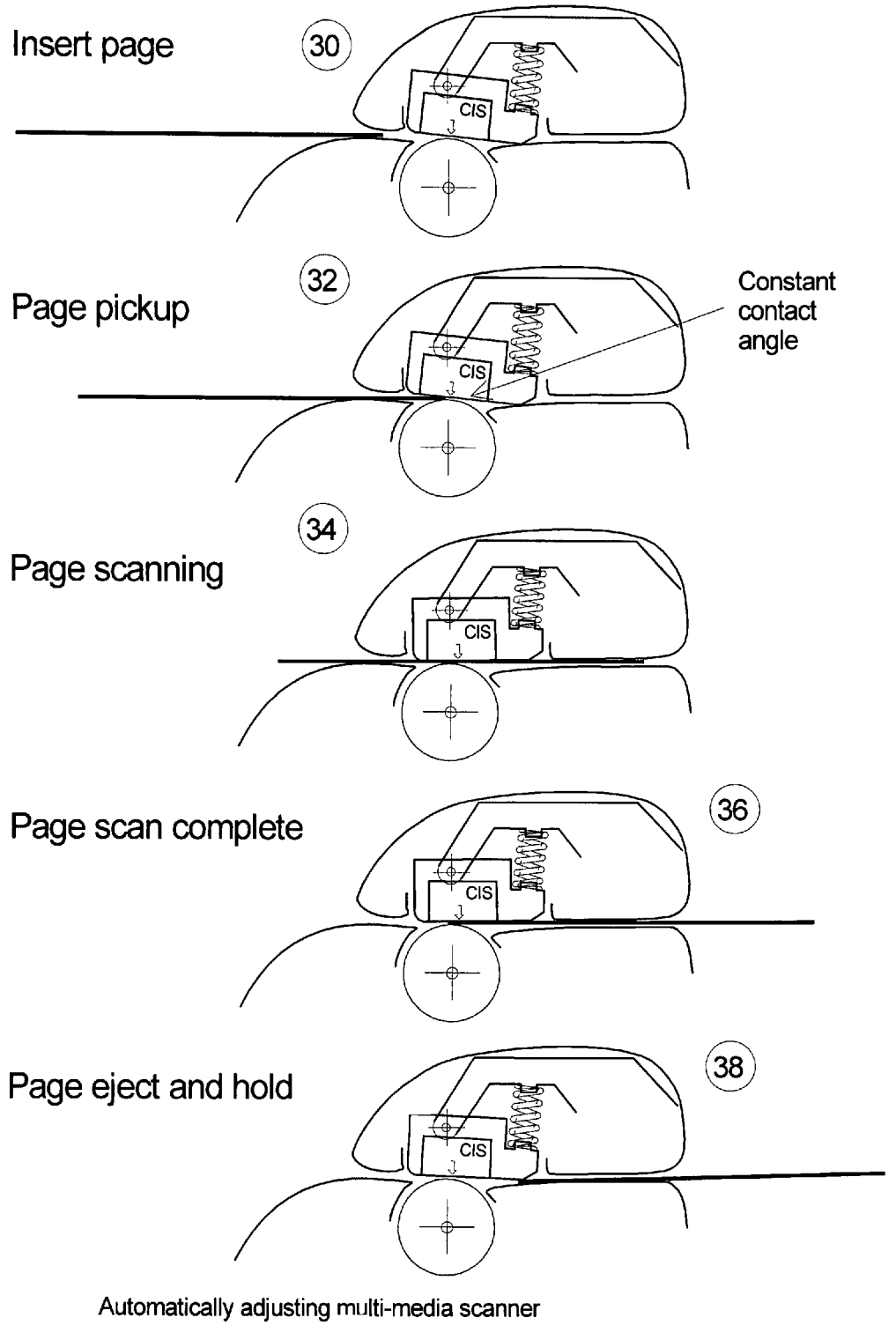
Automatically adjusting multi-media scanner

AUTOMATICALLY ADJUSTING MULTI-MEDIA SCANNER

FIELD

The invention relates to digital document scanners, and more particularly to a scanner which automatically adjusts for and accepts a variety of media thicknesses while optimizing the media's contact with the CIS throughout the imaging process and utilizing the energy produced by a gear/spring system to reduce the need for a large motor.

BACKGROUND OF THE INVENTION

The invention most closely corresponds with USPTO Class 358, wherein the invention involves the communication or reproduction of a static image or sequence of static images in which the density variations composing the image do not vary with time (e.g., a document image) by a method or apparatus.

In its simplest form, the invention comprises a document scanner wherein the hardware allows for a variety of media thicknesses to be scanned without user adjustment, and wherein the CIS remains in constant contact with the media. This invention may be utilized in both simplex and duplex modes.

With current traditional document scanners, the size and/or thickness of the media typically dictates the type and construction of scanner. By way of example, to scan business cards, one type of scanner is typically utilized, and another to scan standard documents. The present invention provides a solution for scanning media in the range of 0.1 mm to 1.5 mm thickness without the user having to make any manual adjustments. Embossed credit cards can also be effectively scanned using the inventive apparatus due to the agility in acceptance and adjustment to thicker media. The design of the document intake is optimized so that the CIS is in constant contact with media surface, which provides a more accurate scan. Further, the energy initially generated by the motor is stored in the spring mechanism and thereby reduces the motor size requirement.

THE INVENTION

Summary, Objects and Advantages

Traditional document scanners containing a contact image sensor (CIS) operate by depressing the image onto a roller via a spring loaded mechanism. This presently occurs by pressure being applied in a positive, single direction, onto the scanner's roller. This construction is limited in that media tends to get stuck in the scanner when the thickness cannot be accommodated by such a process. Further, present art scanner's CIS are set at a fixed angle which results in the first few millimeters of any document scan not being optimized. The present invention provides for a CIS which accommodates in angle to remain in constant contact with the media from insertion to final throughput.

While the present art offers many different types of scanners, one benefit of the present invention is that the scanner can accommodate varying thickness of media without any user adjustments or special media slots. Thus, a user need not purchase one scanner to image business cards, and a different one to scan alternate media. Both simplex and duplex scanning can be addressed using the inventive apparatus. The invention's mode of operation may be known by the trade name "kick-start", and such name may be reserved in the form of a trademark.

Construction of the inventive apparatus involves a system of gears and cantilever(s) to interact with the CIS. In the apparatus, the CIS will rotate as opposed to receiving lateral or unidirectional force to cause the CIS to contact the scanner's roller. Spring tension forces the CIS to remain in contact with the media throughout the imaging process which not only provides for allowance of the thickness of the media, it also provides better image quality by forcing the media to retain consistent contact with the imaging component and roller.

A spring loaded cantilever system is affixed to a series of gears then attached to a motor. The media fed through the scanner's media feed will be of a certain thickness. The motor can be initialized either via an auto-launch wherein a user inserts a document and drawing results or wherein the scanner button is depressed on the scanner. The torque delivered to the largest gear then rotates the smaller gears in unison which causes the roller to drop momentarily. The spring causes the roller to return to position and grabs whatever media has been inserted. The inventive apparatus uses what the inventor terms a "kick start" process whereby the torque from the motor transfers to the gears which will have a driving gear connected to the axis of the cantilever.

When the motor starts, the cantilever system causes the roller to initially and momentarily drop to accept the media based upon its thickness and the roller continues to rotate and pull the media through. A second spring connected to the CIS will adjust to the thickness of the media and insure consistent pressure/angle resulting in consistent imaging throughout the scan path. The CIS begins at an angle and follows the media perpendicular to it throughout the scan process as it rotates from a fixed point. As the motor begins to turn the gears, the lower spring is depressed, and the energy becomes stored in the spring which allows for the momentary lowering of the roller, return, and subsequent "grabbing" of the media. As a result, a smaller motor than the present art scanners is acceptable as the reliance is not solely on the motor to complete the drawing process. The friction with the CIS is overcome due to the cantilever system creating a gap thereby making a smaller, and less expensive motor possible.

The contact angle with the media and the CIS will remain consistent from start to end of scan as opposed to the present art wherein the first few millimeters of the process are not consistent. The inventive self-adjusting mechanism presented allows for a positive media pickup, greatly reducing motor stalls and media skewing. Furthermore, because initially the roller is contacting the CIS, it is much easier to insert media flush to the contact area. This also helps alleviate the need for de-skew via a software method. The entire assembly is self-aligning for ease of manufacture, and the cost to manufacture is less than the present art's scanners of a similar style. In the case of a duplex scanner, the design would include a second CIS located toward the rear of the scan path wherein the front side will be imaged by the first CIS in the path, and a second CIS is located parallel to the backside of the document and images the backside as it passes through the scan path.

BRIEF DESCRIPTION OF THE DRAWINGS

The invention is described in further detail by reference to the drawings in which:

FIG. 2 is a step-by-step flow illustration of the CIS position during media throughput; and

DETAILED DESCRIPTION, INCLUDING BEST MODES OF CARRYING OUT THE INVENTION

Figure 1:
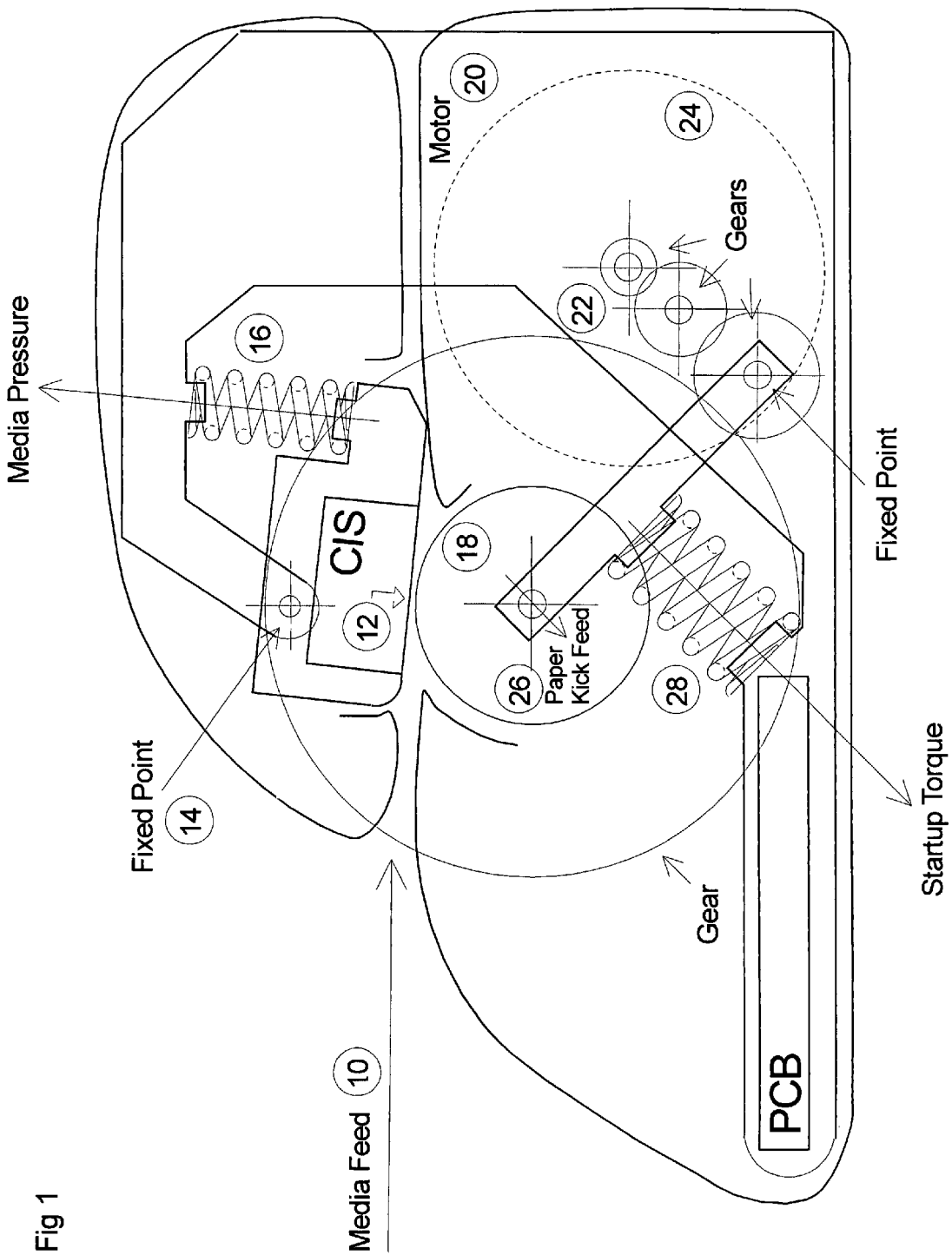
FIG. 1 is a side view of the scanner illustrating the media feed, CIS, and gear/spring system.

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in 2 relatively simple figures; although sufficiently complex as to illuminate to one skilled in the art of such scanner architecture, and calibration methods viable for making or using said invention.

FIG. 1 illustrates the inventive apparatus as a side transparent view. The media feed 10 leads into the CIS 12, which is affixed at a fixed point 14 connected to a spring loaded upper and lower attachment point. Upon media insertion by a user, the CIS 12 which begins at an angle, will rotate to accommodate the thickness of the media, following the media perpendicularly, and remain in constant contact therewith throughout the scan process.

Further to FIG. 1, the roller 18 attached to the paper kick feed is assumed to be immobile until user insertion of media to meet the contact point between the CIS and roller. The motor 20 starts and provides initial energy to the smaller gears 22. The small gears 22 then start the large gear 24 in rotation. During the initial contact for rotation of the roller 18, the torque from the motor very briefly causes the paper kick feed 26 to lower and release the roller 18, which then begins turning. The second, or lower spring 28 allows the paper kick feed 26 to depress. This brief lowering allows for the media to be accepted through the media feed via the rotating roller 18, and "kick started" along the scan path regardless of media thickness.

Further to FIG. 1, as the media is being fed via the "kick start" method, the CIS 12, which begins at an angle, rotates from its fixed point connection 14 to remain in contact with the media regardless of thickness (within the parameters set forth herein). The spring 16 assists the CIS position by depressing to allow the media to continue on its path to the output.

FIG. 2 illustrates the media path as it interacts with the CIS 12 and roller 18. As media is inserted 30, the described "kick start" has occurred allowing the roller 18 to drop momentarily. The roller 18 then returns to position, grabbing the media and as it rotates, pulls the media into the scan path.

Further to FIG. 2, as the media is being scanned 34, the CIS 12 has adjusted to the media thickness and remains in contact with said media. The scan is completed 36 and the media has proceeded to ejection point 38 where the user then removes the scanned media.

The invention claimed is:

1. An automatically adjusting multi-media scanner accommodating simplex or duplex scanning modes, comprising:
   a) a media feed accommodating media thickness of approximately 0.1 mm to 1.5 mm;
   b) a spring tensioned rotating CIS;
   c) a spring tensioned roller connecting to a gear system;
   d) a motor which transfers torque to said gear system;
   d) a cantilever and gear system; and
   e) driving gears connected to the axis of said cantilever.

2. The scanner as in claim 1 wherein the media feed comprises a single horizontal slot to accommodate media thickness of approximately 0.1 mm to 1.5 mm, including embossed credit cards.

3. The scanner as in claim 1 wherein said spring tensioned CIS begins at an angle and rotates in consistent response to a direction of media.

4. The scanner as in claim 1 wherein said roller is spring tensioned to said gear system by a moveable cantilever.

5. The scanner as in claim 1 wherein said motor is connected to a series of gears which rotates upon receipt of power from said motor.

6. The scanner as in claim 5 wherein said motor transfers torque to the gear system and the energy stored in said spring momentarily causes the roller and gear system to lower and allow insertion of media.

7. The scanner as in claim 6 wherein the roller mechanism returns to initial position after spring energy is expended.

8. The scanner as in claim 1 wherein a cantilever connects the spring and gear system and allows for movement of said spring and rotation of said roller.

9. The scanner as in claim 1 wherein the CIS remains in constant contact with an inserted media as a result of rotation from a fixed point on a frame connected to a second (or top) spring, and wherein the CIS rotates to remain in contact from the first millimeter of media to the last.

\* \* \* \* \*